US009361469B2

(12) United States Patent  
Thiyagarajan et al.

(10) Patent No.: US 9,361,469 B2  
(45) Date of Patent: Jun. 7, 2016

(54) ELECTRONIC COMMUNICATION WITH SECURE SCREEN SHARING OF SENSITIVE INFORMATION

(71) Applicant: Amazon Technologies, Inc., Reno, NV (US)

(72) Inventors: Pirasenna Thiyagarajan, Cupertino, CA (US); Donald Loyd Kaufman, Kirkland, WA (US)

(73) Assignee: Amazon Technologies, inc., Reno, NV (US)

( * ) Notice: Subject to any disclaimer, the term of this patent is extended or adjusted under 35 U.S.C. 154(b) by 84 days.

(21) Appl. No.: 14/226,589

(22) Filed: Mar. 26, 2014

(65) Prior Publication Data

US 2015/0278534 A1    Oct. 1, 2015

(51) Int. Cl.
*G06F 21/62*    (2013.01)
*G06Q 30/00*    (2012.01)

(52) U.S. Cl.
CPC .............. *G06F 21/62* (2013.01); *G06Q 30/016* (2013.01)

(58) Field of Classification Search
CPC ............................. G06Q 30/016; G06F 21/62
See application file for complete search history.

(56) References Cited

U.S. PATENT DOCUMENTS

| | | |
|---|---|---|
| 5,301,191 A | 4/1994 | Otani |
| 8,626,675 B1 | 1/2014 | Satish |
| 2002/0184325 A1* | 12/2002 | Killcommons et al. ...... 709/206 |
| 2005/0180338 A1 | 8/2005 | Pirila et al. |
| 2006/0277096 A1 | 12/2006 | Levitus |
| 2007/0124601 A1* | 5/2007 | Singh et al. ................... 713/189 |
| 2007/0127696 A1* | 6/2007 | White ...................... 379/265.09 |
| 2007/0234219 A1 | 10/2007 | Bhattaru |
| 2008/0168135 A1* | 7/2008 | Redlich et al. ................ 709/204 |
| 2010/0257577 A1* | 10/2010 | Grandison et al. ................ 726/1 |
| 2011/0115816 A1 | 5/2011 | Brackney |
| 2011/0249081 A1 | 10/2011 | Kay et al. |
| 2012/0027195 A1* | 2/2012 | Shaffer et al. ............ 379/265.09 |
| 2012/0317487 A1 | 12/2012 | Lieb et al. |
| 2013/0030948 A1 | 1/2013 | Fisher |
| 2013/0122938 A1 | 5/2013 | Sharif-Ahmadi et al. |
| 2013/0147787 A1 | 6/2013 | Ignatchenko et al. |
| 2013/0151353 A1 | 6/2013 | Cobb et al. |
| 2013/0151999 A1 | 6/2013 | Seul |
| 2013/0218783 A1 | 8/2013 | Anand |
| 2013/0330054 A1 | 12/2013 | Lokshin |
| 2014/0007222 A1* | 1/2014 | Qureshi .................. G06F 21/10 726/16 |
| 2015/0052122 A1 | 2/2015 | Landry et al. |

OTHER PUBLICATIONS

PCT Application No. PCT/US2014/050701, Search Report and Written Opinion dated Nov. 12, 2014, 9 pages.

(Continued)

*Primary Examiner* — Kaveh Abrishamkar
*Assistant Examiner* — Tri Tran
(74) *Attorney, Agent, or Firm* — K&L Gates LLP

(57) ABSTRACT

A customer support application provides screen sharing of the user's computing device with a remote customer support agent, thereby enabling the customer support agent to view the content displayed on the user's device. Sensitive information that is displayed on a user's computing device is obfuscated from the computing device of the remote customer support agent, and a notification of that obfuscation is displayed on the user's computing device. Information can be determined to be sensitive based on a sensitive indicator tag or a heuristic.

24 Claims, 9 Drawing Sheets

(56) References Cited

OTHER PUBLICATIONS

Author Unknown, "eBLVD Remote Desktop User Guide," ENC Technology Corp., Available at eBLVD.com, 46 pgs., (2012-2013).
Author Unknown, "How do I use Problem Steps Recorder," Available at http://windows.microsoft.com/en-us/windows7/how-do-i-use-problem-steps-recorder, 2 pgs., (printed Mar. 27, 2014).
Author Unknown, "RERAN—Record and Replay for Android," Available at http://www.androidreran.com/, 3 pgs., (printed Mar. 27, 2014).
Author Unknown, "Session Recording," Available at http://www.islonline.com/remote-support/features/session-recording.htm?hl=no, 2 pgs., (printed Mar. 27, 2014).
Dale, "Recording and replaying events with Android," Lardcave.net, www.lardcave.net, Available at http://www.lardcave.net, 2 pgs., (printed Feb. 26, 2014).
Fisher, "Steps Recorder (What It Is and How to Use It)," About.com Computing PC Support, Available at http://pcsupport.about.com/od/termsp/p/problem-steps-recorder.htm, 1 pg., (printed Mar. 27, 2014).
Gomez et al., RERAN: Timing- and Touch-Sensitive Record and Replay for Android, ICSE pp. 72-81, (2013).
Kaiser et al, "Step-by-Step Guide to Remote Assistance," Microsoft Corp., (Jul. 1, 2001).
Author Unknown, "Amazon.com Help: Connect to a Tech Advisor with the Mayday Button," wvvw.amazon.com Available at www.amazon.com/gp/help/customer/display.html?nodeId=201349900, 2 pgs., (printed Mar. 26, 2014).
Author Unknown, "Amazon.com Help: Mayday: Frequently Asked Questions," www.amazon.com Available at www.amazon.com/gp/help/customer/display.html?nodeId=201364620, 2 pgs., (printed Mar. 26, 2014).
PCT Application No. PCT/US2015/022136, Search Report and Written Opinion dated Jun. 25, 2015, 10 pages.
Author Unknown, "Representative Guide 13.1 Enterprise Licensing," BOMGAR, 77 pages (Nov. 4, 2013).

* cited by examiner

ELECTRONIC COMMUNICATION WITH SECURE SCREEN SHARING OF SENSITIVE INFORMATION

BACKGROUND

Remote support of customer computing devices may be accomplished through sharing a screen of a customer computing device with a remote support agent through the support agent's computing device. Remote customer support may also include two-way voice communication between a customer and a support agent, as well as one-way or two-way video communication from the support agent to the customer. When a support agent views the shared screen of a customer's computing device, a support agent may view a customer's sensitive or confidential information, such as a password, a credit card number, or a social security number. For example, a user device may share a screen of an application including financial or other sensitive information, and the support agent may view the sensitive information on the support agent's computing device.

Accordingly, there is a need for more improved methods of providing remote support.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Systems and methods in accordance with various embodiments of the present disclosure provide improved systems and methods for obfuscation of sensitive information. A support application provides screen sharing of the user's computing device with a remote customer support agent, thereby enabling the customer support agent to see exactly what the user is seeing. In addition, the customer support agent can utilize an application on the agent's computing device to generate graphics to help guide the user. These graphics are then transmitted back to the user's computing device, where the graphics are displayed on top of the user's normal user interface.

In accordance with some embodiments, the support application can also provide screen sharing in conjunction with a live voice chat between the user and the remote customer support agent, and a streaming video image of the customer support agent on the user's computing device. The quality of communication between the user and the customer support agent on these three channels (e.g., screen sharing, voice, and video) is monitored, and when a degradation in quality is detected, the voice channel is prioritized by modifying one or more quality of service parameters of the other communication channels.

Figure 1A:
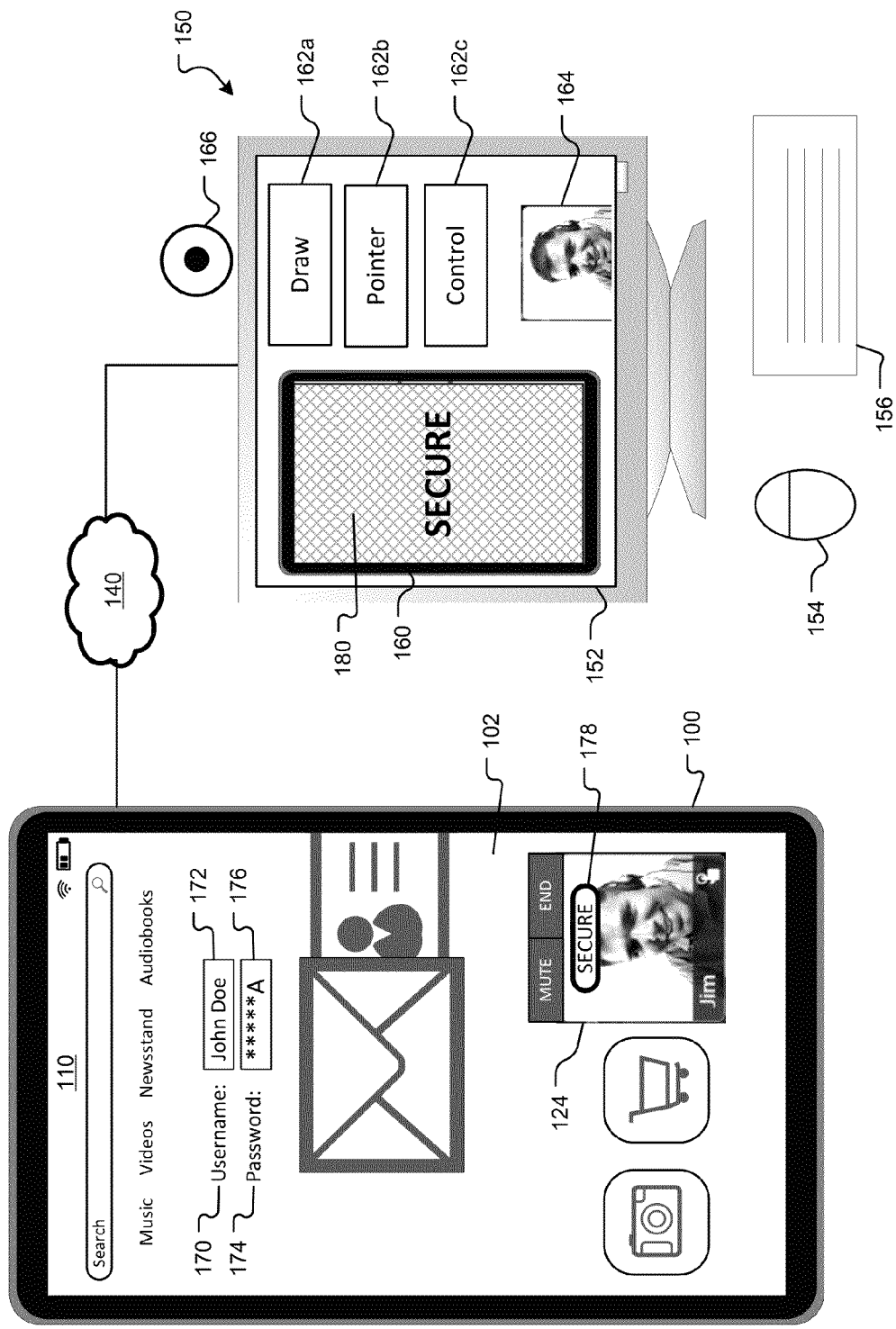
FIGS. 1A-1D are block diagrams illustrating a communication system, in accordance with embodiments of the present invention.

In accordance with some embodiments, if it is determined that the user's computing device is displaying sensitive information, the sensitive information is not displayed or otherwise protected from display to the remote customer support agent. For example, the sensitive information may be obfuscated from the customer support agent's computing device. Such obfuscation may be performed by the user's computing device prior to the current screen being shared, or, alternatively, such obfuscation may be performed by the remote customer support agent's computing device that receives a broadcast prior to display of a shared screen. In some embodiments, information may be determined to be sensitive by searching for a sensitive indicator tag that is associated with a portion of the screen to be shared, such as a password text field. In some embodiments, information may be heuristically determined to be sensitive based on a heuristic and at least one heuristic sensitivity criteria, such as a term being displayed or a term being utilized in an object handle of an application, such as the term "password." Accordingly, when information is determined to be sensitive, as shown in FIG. 1A, the sensitive information may be displayed on the user's computing device but obfuscated from the customer support agent's computing device. It is to be understood that obfuscation of sensitive information may have different embodiments, for example, sensitive information may be hidden, suppressed, concealed, blocked, obscured or otherwise rendered unviewable. In some embodiments, sensitive information may comprise information considered to be confidential, for example, a password, a user identifier or username, a credit card number, a social security number, a bank account number, medical information, and the like.

Figure 1B:
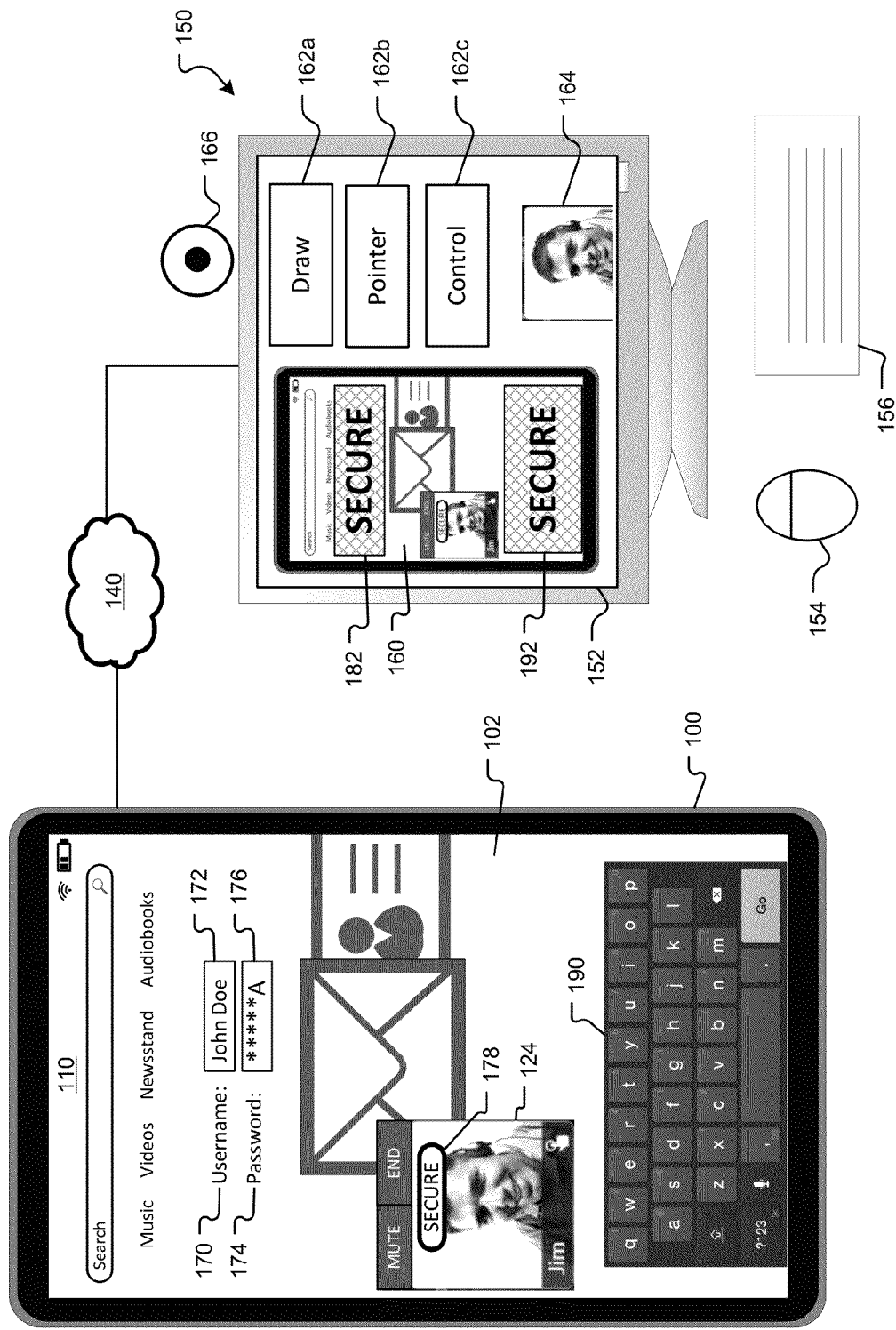
Figure 1C:
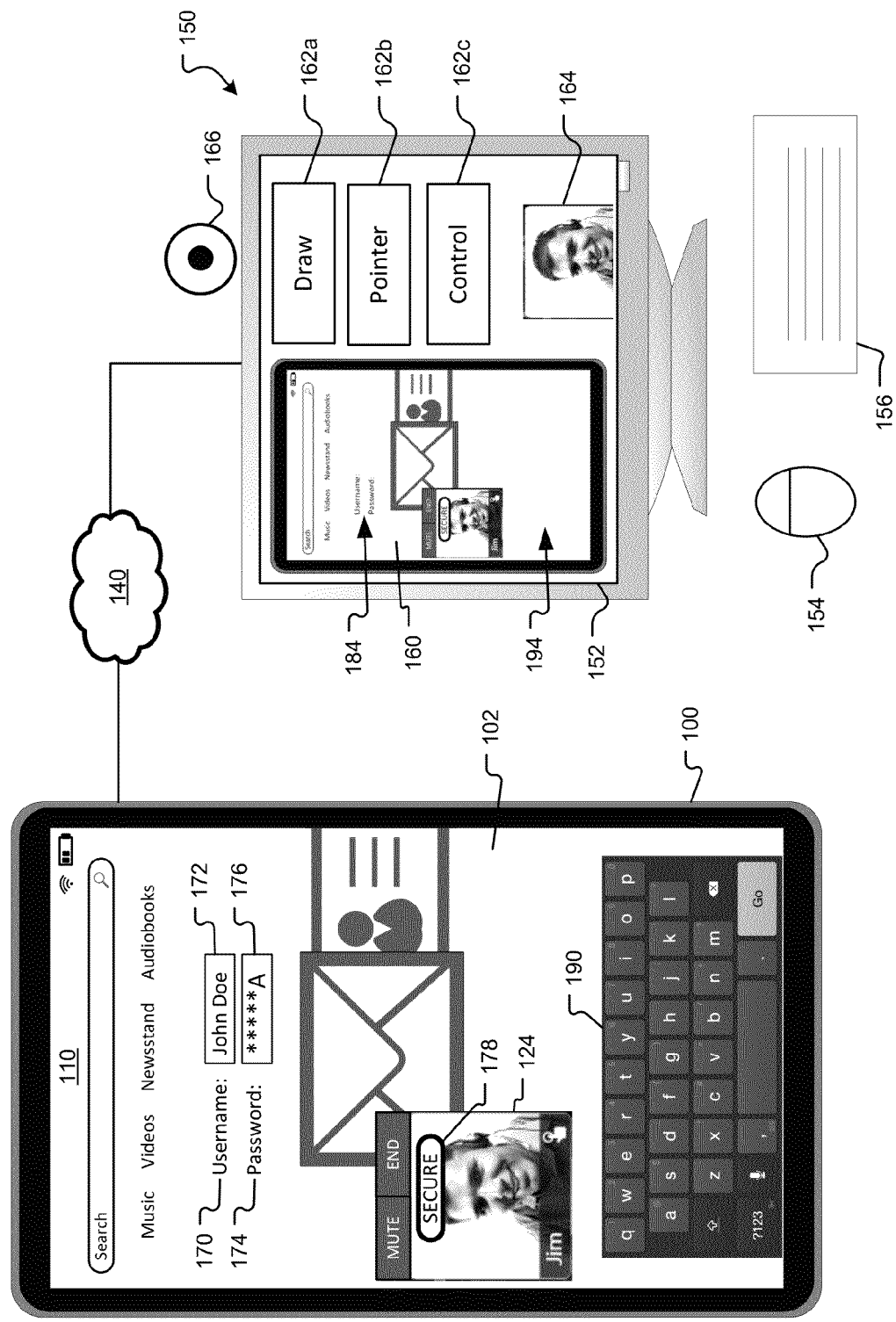
Figure 1D:
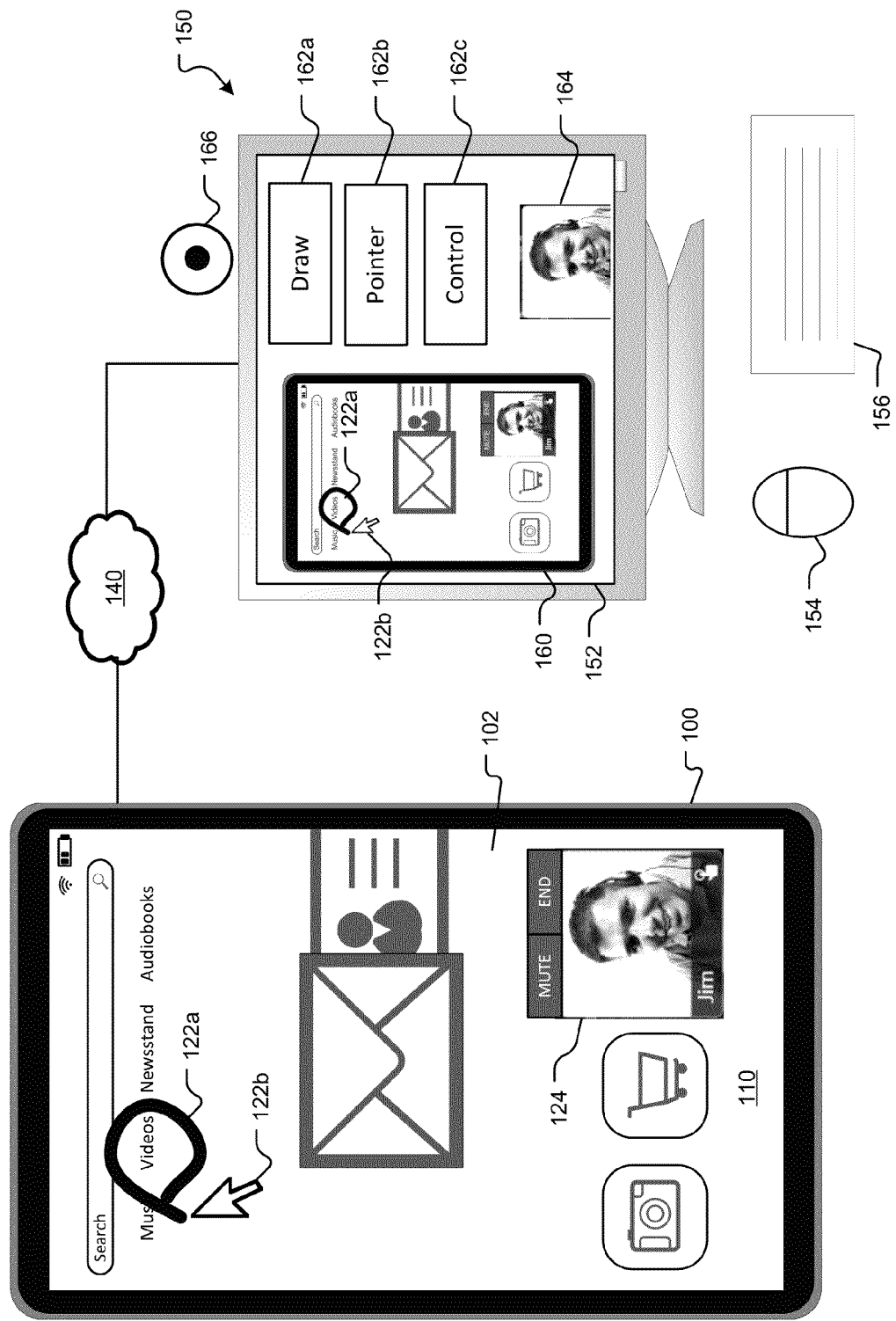

FIG. 1D is a block diagram illustrating a communication system, in accordance with embodiments of the present invention. A user utilizing a first computing device, such as a tablet computing device 100, connects to a second computing device, such as the customer support agent computing device 150, via a network 140. The network 140 includes, for example, the Internet, intranets, extranets, wide area networks (WANs), local area networks (LANs), wired networks, wireless networks, or other suitable networks, or any combination of two or more such networks.

The tablet computing device 100 includes a touch-sensitive display component 102, which produces user interface ("UI") content 110, such as an operating system user interface or the interface of one or more software applications that may run on the tablet computing device 100. An operating system user interface may display a variety of prompts and information, such as, for example, a prompt for a password to access the tablet computing device 100, as well as content such as the current time, the battery life of the device, volume settings, screen brightness settings, and the like. A software application may include a browser that renders web applications and a native or local application, and the like. The user interface of a browser may include the content of a web application that is rendered by the browser. In some embodiments, a web application may comprise a presentation tier of the browser of the tablet computing device 100, an application tier of a web-based server, and a storage tier of a database server, in which each tier has program instructions that may be executed. The user interface of a browser may also include a search box, a back button, and the like. The user interface of a native application may include a log on screen, a data entry screen, a report generation screen, and the like. In some embodiments, the program instructions of the native application are stored in a memory of the tablet computing device 100 and the instructions are configured to be executed by the operating system of the tablet computing device 100.

When the user launches a customer support application on the tablet computing device 100 and initiates a screen sharing function, the user interface content 110 currently being displayed on the tablet computing device 100 is transmitted to the support agent computing device 150. Additionally or alternatively, data representing the user interface content 110 can be transmitted to the support agent computing device 150. Data representing the user interface content 110 may include a copy of the user interface content 110, data representing pixel changes relative to a previous frame rendered as part of the user interface content 110, and/or any other type of data the support agent computing device 150 can process to render displays that show at least a portion of the user interface content 110 in near real-time. To avoid unnecessarily over-complicating the discussion, reference to the user interface content 110 is often made herein where data representing the user interface content 110 could be referenced instead.

The support agent computing device 150 runs a customer support application, which then displays the screen sharing image 160 of the content 110 displayed on the user's computing device 100 on the display 152 of the support agent computing device 150. This screen sharing image 160 enables the customer support representative to better assist the user by presenting the representative with a live feed of the user's computing device 100. Many tablet computing devices are configured to dynamically change the user interface aspect ratio, depending on the orientation in which the device is held by the user. Therefore, the user interface may switch from portrait to landscape mode in the middle of a support session. The customer support application is configured to adjust the screen sharing image 160 to reflect the current orientation of the user computing device 100. Although the user interface for many desktop computers are configured to adjust from landscape to portrait mode, this adjustment is typically done much more frequently by tablet computer users due to the ease with which the orientation may be changed. In addition, many tablet computing applications only operate in a single orientation mode. Therefore, if the user is browsing an application menu in landscape mode, and launches a portrait-only application, the user interface (and screen sharing image 160) will automatically change to portrait mode.

The customer support application may also provide the agent with one or more support tools 162a-162c, which the agent may utilize to respond to the user's inquiries or requests for assistance. In the illustrated embodiment, the customer support application includes a drawing tool 162a, a pointer tool 162b, and a control tool 162c. The agent may utilize peripheral input devices of the agent computing device 150, such as, for example, a mouse 154 and a keyboard 156, to select one of the tools 162a-162c and then interact with the screen sharing image 160 using that tool to produce the desired result on the user's computing device 100.

The drawing tool 162a provides a graphics editor function that enables the agent to utilize one or more graphics tools to create graphical elements 122 to be displayed on top of the user's content 110. The graphics tools may enable the agent to draw freeform and/or non-freeform shapes, such as a line 122a, curve, or box, or to add text or other images. These graphical elements 122 can be transmitted as, e.g., raster or vector graphics images to the user's computing device 100, where they are displayed on top of to the user's computing device 100. The agent may use these graphical elements 122 to provide visual guidance to the user, such as to highlight a button to select or a touch input to perform. For example, if the agent wishes to instruct the user to swipe across a certain portion of the screen, the agent may use the drawing tool to draw a line in the direction of the swipe to be performed. The graphical elements 122 can be transmitted as a live, streaming feed to the user's computing device 100 as they are generated by the agent, so the user can see an animated display of the graphical elements 122. Accordingly, the user can view the line 122a being drawn, and thereby see the movement of the swipe across the display 102. In other embodiments, the graphical elements 122 may be transmitted as static images to the customer's computing device 100. These static images can be drawn by the customer support agent using the agent's computing device 150 and periodically transmitted to the customer's computing device 100 automatically or manually by the agent.

The pointer tool 162b provides the agent with a graphical element comprising a pointer 122b that the agent can move about the screen without leaving a trail or other persistent image, as would occur if using the drawing tool 162a. The agent may move the pointer 122b over the surface of the user's content 110 to draw the user's attention to various elements displayed. The pointer tool 162b provides a transient graphical element that the user can observe as it is manipulated by the agent, but does not leave a persistent image on the display 102. The pointer 122b can function in a similar fashion as the mouse pointer used in traditional graphical user interfaces for selecting items. However, when the user's computing device 100 is a touch-screen computing device, the operating system may be adapted to primarily or solely receive touch inputs, and not utilize a pointer cursor. Therefore, the pointer cursor may not be an integral function of the user's computing device 100. In addition, when the user's computing device 100 does provide for pointer functionality, it may be desirable for the customer support agent to have a separate pointer 122b controlled by the customer support agent, while enabling the user to simultaneously operate the user's pointer function, such as, for example, to carry out the instructions provided by the customer service agent. The ability to show the user what to do, and then permit the user to perform those tasks on his or her own can provide a much more effective training function than if the customer service agent were to perform those tasks directly.

In other situations, it may be desirable for the customer service agent to perform tasks directly on the user's computing device 100. The control input tool 162c provides the agent with the ability to produce inputs that are received by the user's computing device 100 and recognized as user inputs as if the user had provided those inputs using, for example, the touch-screen display 102. The control input tool 162c may provide the agent with a pointer or other cursor that the agent may move across the surface of the content 110 using the mouse 154, with touch inputs being generated using, for example, the buttons on the agent's mouse 154 or keyboard 156. The control input tool 162c may be useful when the agent wishes to perform functions or tasks directly onto the user's computing device 100, rather than merely explain to the user what the user should do, as may be the case when utilizing the drawing tool 162a or pointer tool 162b. This may be particularly desirable when the user does not wish to be trained on how to perform a task, but would rather have the task completed without effort on the user's part.

In other embodiments, the customer support application may provide the customer support agent with other support tools not shown in FIG. 1D. For example, the customer support application may include a library of pre-generated support graphics which may be selected by the customer support agent to be transmitted for display on the user's computing device 100. These pre-generated support graphics may comprise static images and/or animations. This may be particularly useful for teaching users the solutions to common problems. For example, after a user indicates that he needs assistance with connecting to a wireless network, the customer support agent may select a pre-generated graphic or animation that teaches the user how to access the appropriate settings menu for connecting to a wireless network. In some embodiments, the library of pre-generated support graphics displayed on the customer support application are selected based on information received from the user's computing device 100, such as the model type, operating system software running on the computing device 100, and orientation of the display (e.g., landscape or portrait). This may be useful when the sequence of steps and/or locations of menus and icons may vary between different device models, operating system revision level, and orientation of display. By utilizing this user information to select the appropriate pre-generated support graphics made available to the customer support agent, the customer support agent can provide a more precise and user-specific support experience.

In yet other embodiments, the support tools provided by the customer support application may include support graphics that provide guidance to the user on how to provide gesture inputs to the user's computing device 100. In conventional desktop computer operating systems, the user's inputs to the computer are limited by the inputs that may be provided by the keyboard and mouse. In touch-sensitive computing devices, more complex user inputs may be used when interacting with the computing device, including the use of multiple contact points (e.g., using 2, 3, or more fingers contacting the touch-sensitive display), different types of movements across the surface of the display (e.g., touches, swipes, pinches, reverse pinches), and different degrees of contact with the display (e.g., hovering over the display without contact, varying degrees of pressure on the surface of the display). These touch-based user inputs may be more difficult to illustrate using simple graphics, such as lines, circles, and arrows. It may be desirable for the customer support application to be provided with pre-generated support graphics that provide guidance on generating various user inputs. For example, one pre-generated support graphic to teach a reverse pinch input may comprise an animation of a thumb and index finger contacting the display and expanding outwards. The customer support agent may select this support graphic from a library of pre-generated support graphics, and position the support graphic onto a desired location in the screen sharing image 160 of the user's computing device 100. The user will then see the animated fingers on top of the UI content 110, showing the user how to touch the screen with his fingers to generate the desired input.

In yet other embodiments, different forms of communication between the customer support agent and the user may be provided. For example, the live chat between the customer support agent and the user may be text-based, without audio or video communication. Text-based communication may be more desirable in situations where data communications between the user and support agent is limited or expensive.

The support agent computing device 150 may also include a webcam 166 for capturing a live streaming video of the customer service agent using the computing device 150. The customer support application may include a video image 164 so that the agent, and the same image will be transmitted to the user's computing device 100 and shown in the video image portion 124 of an agent interface element 120. The agent interface element 120 may contain additional graphical elements and/or controls, such as, for example, a control portion 126. In the illustrated embodiment, the control portion 126 includes an information portion 128, displaying text, such as the agent's name, and one or more control icons 129, which, when selected by the user, can perform various functions. In this embodiment, if the user wishes to relocate the position of the agent interface element 120, the user can select the hand control icon 129 and drag the agent interface element 120 across the display. Additional controls 125a-125b may also be displayed to enable the user to perform additional functions, such as muting the live chat using mute control 125a and ending the support session using end control 125b.

Figure 2:
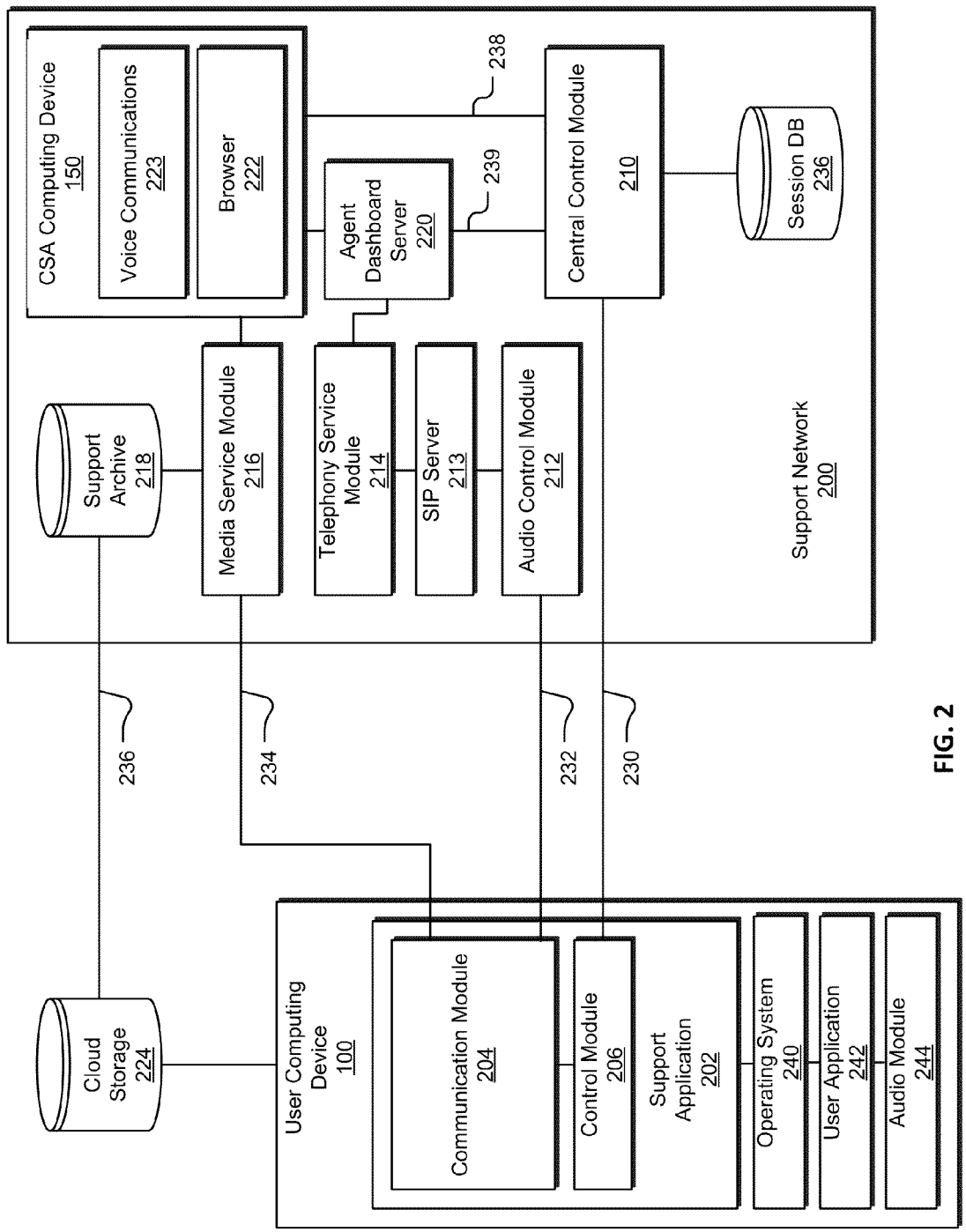
FIG. 2 is a block diagram illustrating an exemplary environment in which embodiments of the present invention may be implemented.

FIG. 2 is a block diagram illustrating an exemplary environment in which embodiments of the present invention may be implemented. The user's tablet computing device 100 is provided with a processing element and memory configured to execute various software applications, including a support application 202 comprising a communication module 204 and a control module 206. The support agent computing device 150 is provided as part of a support network 200, which includes a central control module 210, an audio control module 212, a Session Initiation Protocol (SIP) server 213 (or other communications server), a telephony service module 214, a media service module 216, a support archive 218, and an agent dashboard server 220. The support agent computing device 150 also includes a processing element and memory configured to execute various software applications, including a web browser application 222. The support agent computing device 150 may also include a voice communications module 223, which may include a voice communications headset or other microphone and speaker hardware, and corresponding software for handling voice communications between the agent computing device 150 and the user computing device 100. Although various components are illustrated as discrete blocks in FIG. 2, it is to be understood that the blocks are merely illustrative and the functionality of each component may be implemented using software executing one or more computing devices, such as a series of servers located in different physical locations.

The user computing device 100 may include an operating system 240, such as the Fire OS operating system by Amazon.com, Inc., the Android operating system by Google, Inc., as well as Linux-based operating systems, Windows-based operating systems by Microsoft Corp., and iOS-based operating systems by Apple Inc. The user computing device may include at least one user application 242, such as a native application, a browser-based application, and the like. In some embodiments, when the user application 242 is executed, all or a portion of the UI content 110 may comprise the display of the user application 242. The support application 202 may comprise a browser-based software application operating in the applications layer of the operating system. The communication module 204 may implement, for example, a protocol for browser-based real-time communication, such as WebRTC. The communication modules 204 enables the real-time one-way or two-way media streaming between the browser-based support application 202 running on the user computing device 100 and the browser application 222 on the support agent computing device 150. When the user computing device 100 is running the Android operating system, the communication module 204 may utilize a WebView element to render the graphical content provided by the support agent computing device 150 and displayed on top of the UI content 110.

The user computing device 100 may include an audio module 244, which may comprise one or more speakers or an audio output jack for external speakers such as earbuds or headphones. The audio module may be utilized by a screen reader or a text reader to present text or images displayed on a screen as audio or sound, such as spoken words. In some embodiments with a touch sensitive display, a user may touch a portion of a display and the text near the touch may be read aloud to a user. If a user were to touch near a displayed field that is determined to contain sensitive information, that information may not be read aloud publicly. For example, a message may be delivered to the user to connect headphones to the user computing device 100 for private listening before the sensitive text is read aloud. It is to be understood that embodiments of the invention are applicable to other eyes-free accessibility to a display screen. For example, in some embodiments, the user computing device 100 may include an output jack for connection to a Braille output device or the like.

The central control module 210 may comprise a management application running on a computer server in the support network 200. The central control module 210 handles control and communication between a plurality of user computing devices and support agent computing devices, and other components of the support network 200. For example, a broadcast or message from a user computing device 110 to a support agent computing device 150 may be routed via the central control module 210, or alternatively, may be routed via the media service module 216. In some embodiments, the support agent computing device 150 may register to receive a broadcast or message from the user computing device 110. In some embodiments, the broadcast or message may indicate that a screen that will be shared contains sensitive information. Accordingly, the sensitive information of the shared screen may be obfuscated from the browser application 222 of the support agent computing device 150. In some embodiments, portions of the shared screen may be obfuscated or all of the shared screen may be obfuscated. When a user launches the support application on a computing device (e.g., support application 202 on computing device 100), the support application 202 establishes a connection with the central control module 210 via a session control channel 230. The central control module 210 initiates a new support session and transmits the session information to the agent dashboard server 220 via communications channel 239. The communications channel 239 is used to transmit session status and control information to the support application 202 and may also be used to receive information to initiate an audio communication session between the user computing device 100 and the agent computing device 150. The agent dashboard server 220, in turn, assigns the new support session to one of the customer support agent computing devices (e.g., customer support agent computing device 150). The central control module 210 stores information regarding all of the customer support sessions provided by the support network 200 in session database 236. The central control module 210 also maintains an agent control channel 238 with the agent browser 222. The agent control channel 238 may be used to transmit graphics between the user computing device 100 and the agent computer device 150 and may also be used to transmit signal information to establish the media session between the user computing device 100 and the agent computing device 150.

The audio control module 212 manages the voice communication between the user computing device 100 and the agent computing device 150. The audio control module 212 may comprise a session border controller (SBC) to manage Voice Over IP communications between the user computing device 100 and the agent computing device 150, including management of quality of service (QoS) parameters, such as rate limiting, bitrate management, and the like. The audio control module 212 receives the voice data via audio channel 232 and passes the voice data to the telephony service module 214. The telephony service module 214 then routes the voice communication to the corresponding agent computing device 150 via the agent dashboard server 220. The audio channel 232 can establish the voice session using a signaling communications protocol such as the Session Initiation Protocol (SIP) and a transport protocol such as the Real-time Transport Protocol (RTP).

The media service module 216 handles the graphical media streaming between the user computing device 100 and the agent computing device 150. The media service module 216 may be implemented as a computer server implementing a Traversal Using Relays around NAT ("TURN") protocol for handling data over TCP and UDP connections. The graphical media streaming handled by the media service module 216 can include one or more of the screen sharing graphics from the user computing device 100, the graphical elements 122 from the agent computing device 150, and the video image 164 of the agent. The media streaming between the communication module 204 and the media service module 216 via WebRTC can be provided over a media channel 234. In some embodiments, the graphical elements 122 from the agent computing device 150 may be transmitted from the central control module 210 to the control module 206 on the user computing device 100 via session control channel 230.

The support archive 218 comprises a storage system that can be used to store all of the media exchanged during a customer support session between the user computing device 100 and agent computing device 150. The stored media may be used for training and audit purposes, such as to review the performance of the various customer service agents in the support network 200. In accordance with some embodiments of the present invention, the stored session data may be made available to the user so that the user may review a recording of a previously-held customer support session. This can be particularly helpful to users who wish to review the instructions provided by the customer service agent. In some embodiments, after a customer service session is completed, the stored session data, including one or more of the audio, video, screen sharing, and graphical elements from the agent, may be transmitted to the cloud storage server 224 and stored in the user's personal database, for later retrieval and playback by the user. The stored session data may be stored as a video file that can be played back and viewed by the user exactly as the user had experienced it live during the customer service session. In some embodiments, the stored session data may obfuscate any sensitive data that was also obfuscated on the support agent computing device 150 during the customer service session.

Communication Prioritization

In accordance with embodiments of the present invention, a customer support agent at computing device 150 may have multiple simultaneous modes of communication with the user at computing device 100, and the transmission of one or more of those multiple modes of the communication may be prioritized over the other modes of communication, depending on the adequacy of the network communications between the user computing device 100 and the agent computing device 150. As described above, those communication modes may include voice communication via audio channel 232, screen sharing of the user computing device 100 to the agent's computing device 150 via media channel 234, graphical elements generated by the customer service agent and transmitted to the user computing device 100 via session control channel 230, and streaming video images of the customer service agent captured by the webcam 166 and transmitted to the user computing device 100 via media channel 234.

In some embodiments, it may be desirable that the voice communication between the user and the agent be provided with a higher priority than the other modes of communication. In many situations, maintaining reliable voice contact is the most effective way of providing customer service, and degradation in voice communications can be particularly frustrating for the end user. Accordingly, when a reduction in quality in data communications between the computing device 100 and computing device 150 is detected, the transmission parameters for one or more of the other modes of communication may be modified, temporarily suspended, or terminated, so as to preserve the quality of the voice communication.

The session control channel 230 may be used to communicate detected changes in communication quality and/or to communicate adjustments in transmission parameters for the one or more other modes of communication. Most communication protocols include some form of quality detection methods, which may monitor different aspects of the communication, such as, for example, service response time, loss, signal-to-noise ratio, cross-talk, echo, interrupts, frequency response, loudness levels, bit rate, etc. The quality detection method may also comprise feedback from the user or agent regarding their respective perceptions of communication quality. Quality status detected by the agent's browser 222 can be communicated to the central control module 210 via the agent control channel 238, and quality of service status detected by the user's support application 202 can be communicated to the central control module 210 via the session control channel 230.

The central control module 210 may be configured to monitor the communications between the user computing device 100 and the agent computing device 150 to maintain a minimum level of communications quality. In some embodiments, if the quality of voice communication drops below a predetermined level, then the transmission parameters of one or more of the other modes of communication is adjusted. In other embodiments, if the quality of communications on one or more of the modes of communication drops below a predetermined level, then the transmission parameters of one or more of the other modes of communications can be adjusted in accordance with a predetermined prioritization order. For example, the voice communications may be assigned the highest prioritization, followed by the user computing device screen sharing, followed by the graphical elements from the agent support tools, with the agent video streaming having the lowest priority. In some embodiments, when a shared screen contains sensitive information and the shared screen is obfuscated from the support agent computing device 150, the prioritization of the screen sharing may be set to the lowest priority due to the shared screen not being displayed to the support agent. Under such embodiments, when the shared screen no longer contains sensitive information, the prioritization of the screen sharing may be restored to a previous priority.

Various mechanisms may be used to adjust the transmission parameters of the modes of communication. For example, the bit rate of one or more of the non-voice communications modes may be reduced. Alternatively, other methods may be used to modify the communication parameters, such as, for example, adjusting the frame rate or changing the codec.

The changes in communication parameters to prioritize one or more communication modes may be initiated by the central control module 210 based on quality measurements sent by either the user computing device 100 over session control channel 230 or the agent computing device 150 over agent control channel 238. The instructions for adjustments to be made to the communication parameters are then transmitted by the central control module 210 back to the user computing device 100 over session control channel 230 or the agent computing device 150 over agent control channel 238, or both, depending on the type of parameter being changed. In cases where only one of the computing devices 100 or 150 controls the transmission parameters, the instructions may transmitted to only that device to implement the desired transmission parameter change so as to prioritize the voice communications between devices 100 and 150. In other cases, the instructions may be transmitted to both endpoints of the communication, e.g., user computing device 100 and agent computing device 150, so that each device may make the desired adjustment.

Support Content Overlay

Figure 3:
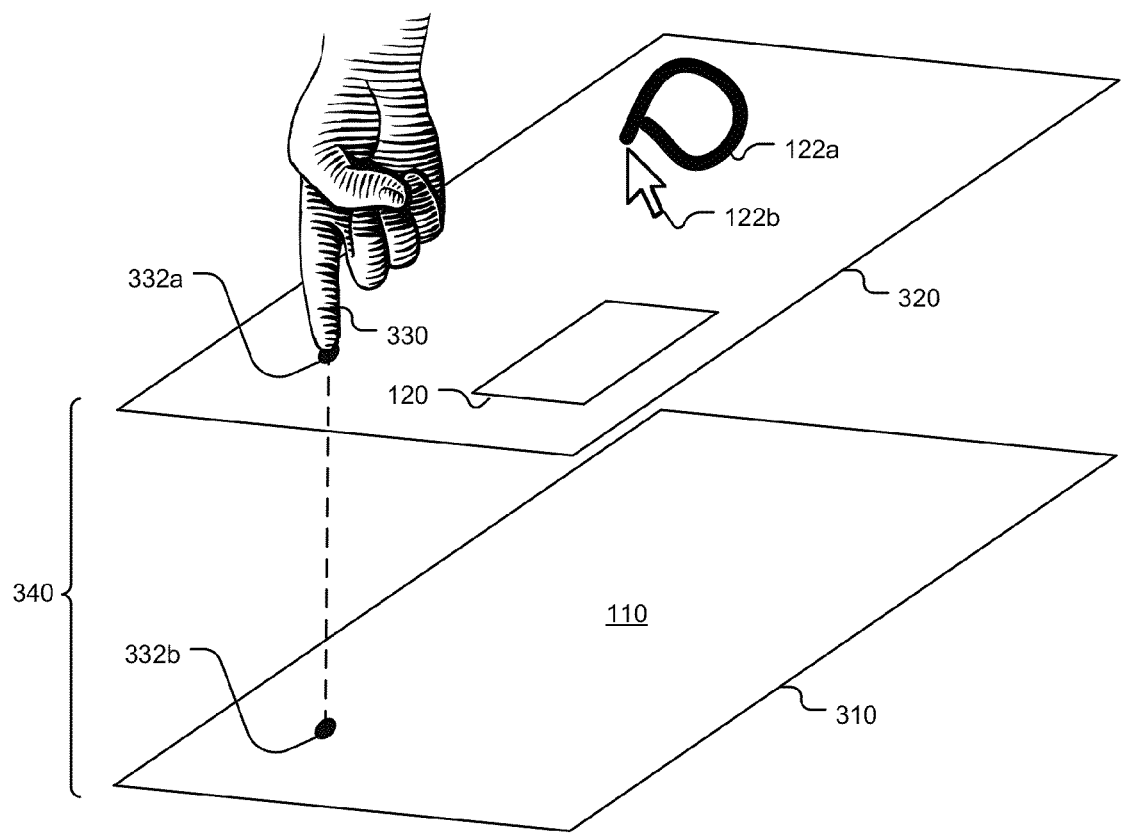
FIG. 3 illustrates the detection of touch inputs in a support session interface, in accordance with embodiments of the present invention.

FIG. 3 illustrates the detection of touch inputs in a support session interface, in accordance with embodiments of the present invention. As described above, a customer support agent at computing device 150 may generate graphical elements that are transmitted to the user computing device 100 to be displayed on the user computing device 100 on top of the user's user interface content 110. These graphical elements may be used by the agent to communicate with the user for customer support, troubleshooting, training, or other communication purposes.

During normal operation of the user computing device 100, the display component 102 displays UI content 110 in a UI layer 310. The UI layer 310 may comprise, for example, a window or frame filling all or a portion of the display area of the user computing device 100. The UI content 110 displayed in the UI layer 310 includes, for example, the user interface of the operating system 240, or the interface of one or more software applications running on the user computing device 100, such as the user application 242.

When the customer support application is initiated, a support session interface 340 is displayed by the display component 102. The support session interface 340 may include multiple logical layers, with the content in each layer being combined and rendered in the support session interface 340. In the embodiment illustrated in FIG. 3, a support content layer 320 is generated and displayed on top of the UI layer 310 in the support session interface 340. The support content layer 320 is transparent, so as to enable the user to view all of the content displayed in the UI layer 310 through the support content layer 320. However, any graphical elements generated by the agent computing device 150 and transmitted to the user computing device 100 are displayed in the support layer 320. These graphical elements may be partially transparent, thereby enabling the user to view the content in the UI layer 310 below, or opaque, thereby blocking the view of the content in the UI layer 310 below.

In the example described above with respect to FIG. 1D, the agent interface element 120 displays a video image portion 124, an information portion 128, and controls 125a-125b. As shown in FIG. 3, the graphical content of the agent interface element 120 is rendered in the support content layer 320. Additional graphical elements created by the customer support agent may also be displayed in the support content layer 320, such as a pointer 122b, lines 122a, or other graphical elements created by the customer support agent for display on the user's computing device 100.

It may be desirable to permit the user to continue to interact with the elements displayed in the UI layer 310, even when the support content layer 320 is displayed overlaying the UI layer 310. On touch-enabled computing devices, the user may interact with the elements displayed on the computing device by touching one or more fingers 330 to the display. The contact of the finger 330 to the display is detected as a touch input by the computing device 100. When a transparent support content layer 320 is displayed on top of the UI layer 310, the user's touch input 332a may be detected by the computing device's hardware and passed to software producing the support content layer 320 (e.g., the support application 202) as an input command or input event. When the touch input 332a corresponds to a portion of the support content layer 320 that does not contain any control elements, the touch input 332a is forwarded from the support application 202 to the software producing the UI layer 310 (e.g., the computing device's operating system 240 or a software application such as the user application 242) as a touch input 332b to the same location on the display as the original touch input 332a.

In this way, the user may continue to interact with the underlying UI content displayed in the UI layer 310 while the support agent is providing support to the user. This may be particularly useful when the support agent is teaching the user how to perform an operation. The support agent may create graphical elements, such as lines 122a or pointers 122b, on the user's display to direct the user to the appropriate element, control, or relevant portion of the UI content, while simultaneously guiding the user via voice communications. In some embodiments, it may be desirable for the user to passively observe the support agent's control of the user's computing device 100. However, in other embodiments, it may be desirable for the user to interactively follow the support agent's graphical, textual, and/or audio guidance to perform the desired tasks.

In accordance with embodiments of the present invention, audio communications between the user and the customer support agent may be provided via a telephone call from the user's residential telephone system or mobile telephone. The telephone call between the user and the customer support agent may be initiated before or after the support application 202 is launched on the user computing device 100 and the customer support session is initiated between the user computing device 100 and the agent computing device 150.

In order to initiate a telephone call to a customer support agent before launching the support application 202, the user may dial a predetermined customer service number using any conventional telephone system or telephone network. If, during the course of that telephone call, the user launches the support application 202, the existing telephone call between the user and the support agent will be associated with the customer support session initiated between the user computing device 100 and the agent computing device 150. This association may be established automatically by the central control module 210 when the support application 202 initiates the support session if the user has already provided identifying information during the telephone call. This identifying information may comprise a user login, device name, telephone number associated with the user computing device 100, or other information that may be used to uniquely identify the user computing device 100, and may be provided manually using telephone keypress entries, verbally to the support agent, or automatically via caller identification. The central control module 210 can then route the support session request from the support application 202 to the agent computing device 150 of the customer support agent already on the telephone with the user. The user and the customer support agent may then continue the telephone call in conjunction with the screen sharing and graphical support content described above.

Alternatively, the support agent may verbally convey telephone session identifying information to the user. The user may then manually enter this telephone session identifying information (such as, e.g., a session identification number) into the support application 202 when initiating the support session. The central control module 210 can use this telephone session identifying information to route the support session to the customer support agent already on the phone with the user.

In other embodiments, the user may initiate the support session between the user computing device 100 and the agent computing device 150 before a telephone call is established with the customer support agent. This may be desirable when the user computing device 100 does not support bidirectional audio communications (e.g., the user computer device 100 does not have a microphone or voice communications capability) or if the network connectivity is inadequate to support a reliable voice communication session. After the user launches the support application 202, the user may be prompted to select whether the user wishes to establish voice communications with the support agent via the user computing device 100 or via a separate telephone call. If the user selects a telephone call, the user may be prompted to enter a telephone number where the user may be contacted, or the user may be provided with a telephone number for contacting the customer support agent.

Obfuscation of Sensitive Information

FIG. 1A is a block diagram, which is similar to FIG. 1D described above, illustrating a communication system, in accordance with embodiments of the present invention. As illustrated in FIG. 1A, a first computing device, such as a tablet computing device 100, is connected to a second computing device, such as the customer support agent computing device 150. Such a connection is similar to that described above for FIG. 1D. In the embodiment of FIG. 1A, the UI content 110 of the computing device 100 is prompting a user with a username prompt 170 and a password prompt 174, both of which may be determined to be prompting for sensitive information. If the current UI content 110 has been determined to comprise sensitive information, the screen sharing image 160 may be obfuscated on the customer support agent computing device 150. It is to be understood that such obfuscation may occur by the computing device 100 not sharing the UI content 110, or by the support agent computing device 150 blanking or hiding the screen sharing image 160. In the embodiment illustrated in FIG. 1A, an obfuscation area 180 may replace the screen sharing image 160, and the obfuscation area 180 may display a message to the support agent that the obfuscation area 180 has replaced the screen sharing image 160, such as displaying the word "SECURE" that indicates that the sensitive information is secure.

The user may be prompted on the computing device 100 with a notification that the sensitive information is secure. In some embodiments, the notification may be displayed in a dialog box or the like. In the embodiment illustrated in FIG. 1A, a prompt 178 is displayed in the video image portion 124. The prompt 178 may display the word "SECURE" that indicates that the sensitive information displayed on the UI content 110 is secure and is protected from display or not displayed to the support agent on the support agent computing device 150. Accordingly, the user may enter or type the sensitive information into a field displayed on the UI content 110 while it is obfuscated from the support agent computing device 150. For example, as illustrated in FIG. 1A, the user may enter a username in the username text box 172 and may enter a password in the password text box 176. Under this embodiment, the support agent is unable to view the username or the password because the screen sharing image 160 is obfuscated on the support agent computing device 150.

It is to be understood that after the sensitive information is entered into or received by the computing device 100, the UI content 110 may change by no longer displaying or prompting for secure information such as a password. For example, after a user has logged onto a user application 242 by entering a password, because the secure information has been received by the user application 242, the UI content 110 may no longer display or prompt for such secure information. Accordingly, under some embodiments, when the UI content 110 is no longer displaying or prompting for secure information, the screen sharing image 160 may be displayed on the support agent computing device 150, such as illustrated in FIG. 1D.

In some embodiments, a user may be prompted for a user indication that the user chooses to display the sensitive information on the support agent computing device 150. For example, the user may be prompted to deobfuscate the obfuscated information. The user may have a variety of reasons for choosing to deobfuscate information that was determined to be sensitive. For example, a user may be requesting a support agent to reset a password, and since the support agent is providing the user with the new password, there is no need to obfuscate such information on the support agent computing device 150. For further example, a user may decide that the information determined to be sensitive is sharable information. Such a decision by a user may be based on a user's personal opinion. Such a user opinion may be appropriate, for example, when a heuristic determines that information is sensitive, but the heuristic has reached an incorrect determination, as further described below. Accordingly, a user may from time to time recognize an incorrect determination of sensitive information, and the user may choose to deobfuscate the information. It is to be understood that a user may be prompted to deobfuscate information with a dialog box or the like. In some embodiments, a user may select the prompt 178, which may cause the screen sharing image 160 to display on the support agent computing device 150. Accordingly, with deobfuscation, the obfuscation area 180 would not indicate obfuscation to the support agent because the sensitive information would be viewable by the support agent.

FIG. 1B is a block diagram, which is similar to FIG. 1A described above, illustrating a communication system, in accordance with embodiments of the present invention. As illustrated in FIG. 1B, the UI content 110 of the computing device 100 has been determined to comprise sensitive information. For example, the UI content 110 may prompt the user for a username with a username prompt 170 via a username text box 172 and for a password with a password prompt 174 via a password text box 176. In some embodiments, the portion of the screen sharing image 160 that comprises the sensitive information may be obfuscated. In the embodiment illustrated in FIG. 1B, the username prompt 170, the username text box 172, the password prompt 174, and the password text box 176 are obfuscated within the obfuscation area 182. Similar to the embodiment of FIG. 1A, it is to be understood that such obfuscation may occur by the computing device 100 not sharing the sensitive portion of the UI content 110, or by the support agent computing device 150 blanking or hiding the sensitive portion of the screen sharing image 160. Similar to the obfuscation area 180 of FIG. 1A, the obfuscation area 182 may display a message to the support agent that the obfuscation area 182 replaces the sensitive portion of the sharing image 160, such as displaying the word "SECURE." However, in contrast to the embodiments of FIG. 1A, other portions of the screen sharing image 160 may be displayed on the support agent computing device 150. For example, portions of the screen sharing image 160 that are not determined to comprise sensitive information may be displayed.

FIG. 1C is a block diagram, which is similar to FIG. 1B described above, illustrating a communication system, in accordance with embodiments of the present invention. As illustrated in FIG. 1C, the UI content 110 of the computing device 100 has been determined to comprise sensitive information. For example, the UI content 110 may prompt the user for a username with a username prompt 170 via a username text box 172 and for a password with a password prompt 174 via a password text box 176. In some embodiments, the portion of the screen sharing image 160 that comprises the sensitive information may be obfuscated. In the embodiment illustrated in FIG. 1C, the username text box 172 and the password text box 176 are obfuscated. Similar to the embodiment of FIG. 1A, it is to be understood that such obfuscation may occur by the computing device 100 not sharing the username text box 172 and the password text box 176 or by the support agent computing device 150 blanking or hiding the username text box 172 and the password text box 176. However, in contrast to the embodiments of FIG. 1B, there is no obfuscation area 182. Instead, the prompts are displayed without the corresponding text boxes, as shown in area 184. Accordingly, because the text boxes are not displayed or protected from display on the screen sharing image 160, the sensitive information is not viewable by the support agent.

In some embodiments, such as those illustrated in FIGS. 1B-1C in which portions of the screen sharing image 160 are displayed, the display or representation of user input may be obfuscated. For example, the computing device 100 may be a tablet computer, and the user may input a password into the text box 176 via touch inputs to a virtual keyboard, e.g. a keyboard representation shown on the display of the computing device 100. When the computing device 100 receives a touch input to the virtual keyboard, the virtual keys of the virtual keyboard may indicate virtual depressions of the virtual keys. In such a case of the UI content 110 including a virtual keyboard for user input, the UI content 110 may be shared via the screen sharing image 160, such that virtual key depressions may be visible to a support agent. In some embodiments, when the UI content is determined to include sensitive information, the representation of user input, such as a virtual keyboard portion of the UI content 110, may be obfuscated from the screen sharing image 160. It is to be understood that any type of display or representation of user input, such as virtual handwriting, virtual mouse clicks, and the like, may be obfuscated from the screen sharing image 160 of the support agent computing device 150. As illustrated in FIG. 1B, a keyboard representation 190 may be displayed on the computing device 100, but may be obfuscated from the support agent computing device 150 within the obfuscation area 192. In an alternative embodiment illustrated in FIG. 1C, a keyboard representation 190 may be displayed on the computing device 100, but may be obfuscated from the support agent computing device 150 by eliminating the image of the keyboard representation 190 altogether, leaving a vacant region 194.

Figure 4:
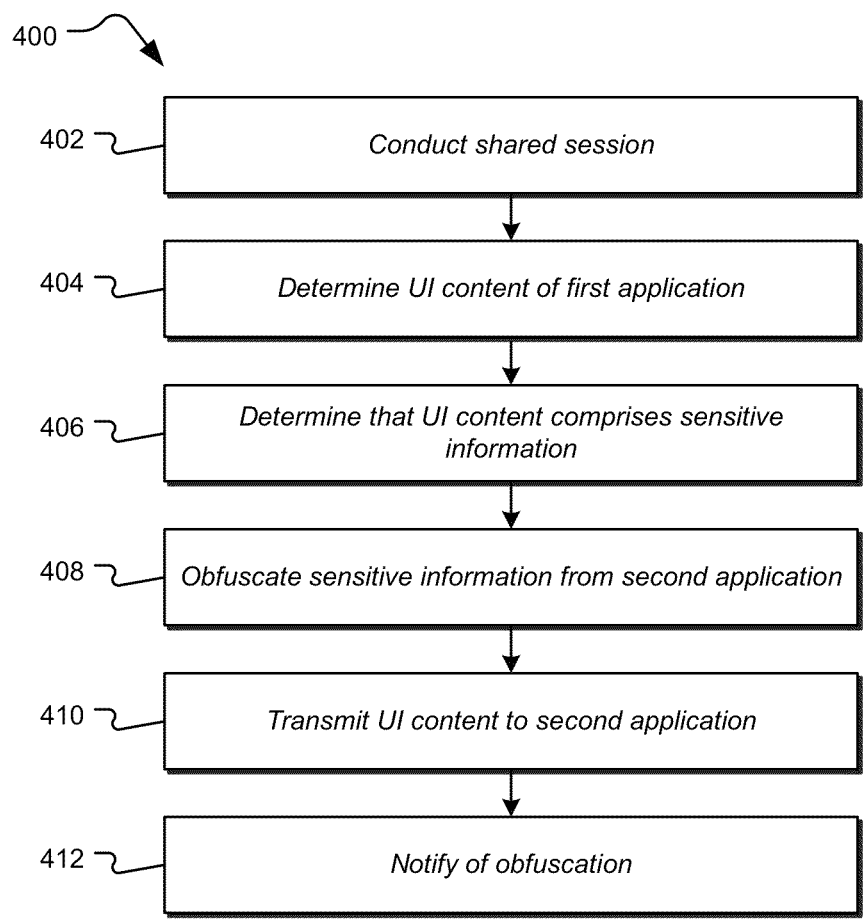
FIG. 4 is a flowchart illustrating a method of obfuscating sensitive information, in accordance with embodiments of the present invention.

FIG. 4 is a flowchart 400 illustrating a method of obfuscating sensitive information, in accordance with embodiments of the present invention. In step 402, a shared session may be conducted between a first application and a second application, for example, a support session between a computing device and a support agent computing device. In step 404, UI content of the first application may be determined, for example, the determination of a user interface of the operating system or the interface of one or more software applications that may run on a computing device. In some embodiments, the determined UI content may be displayed on a display component of the computing device. In step 406, it may be determined whether the UI content comprises, contains or includes sensitive information, as discussed below. Although not shown, in some embodiments a user may be prompted to provide an input indicating whether the UI content contains sensitive information, even when there is no automated software-based determination of sensitive information in step 406. For example, a button may be displayed to the user that allows the user to indicate that the UI content contains sensitive information, regardless of the determination of step 406.

In step 408, the sensitive information may be obfuscated from the second application. In step 410, the UI content may be transmitted to the second application. It is to be understood that the second application may reside on the same computing device as the first application, or alternatively, may reside on a different computing device. In some embodiments, the other computing device is located remotely from the first computing device running the first application, and is in data communication with the first computing device via a local or wide area network, such as the Internet.

In accordance with some embodiments, the sensitive information may be excluded or prohibited from being transmitted to the second application by preventing the transmission of the sensitive information out of the first application or out of the first computing device. For example, when the second application resides on a different computing device, prohibiting such transmission prevents the transmission of the sensitive information onto the local or wide area net, which not only causes obfuscation of the sensitive information from the second computing device, but also causes obfuscation of the sensitive information from other components of the computer network such as a support network 200 or the Internet.

In accordance with other embodiments as described below, step 410 may comprise broadcasting a sensitivity message to the second application. For example, if it is determined that sensitive information will be displayed in the UI content of a first application, a sensitivity message may be broadcast to the second application with information indicating obfuscation of sensitive information by the first application or enabling obfuscation of the sensitive information from the second application. In some embodiments, the second application may respond with a confirmation message that the sensitivity message was received. In step 412, a user of the first application may be prompted with a notification of the obfuscation of sensitive information from the second application, for example, a notification may be displayed on the computing device of the first application.

It is to be understood that the order of the steps of FIG. 4 may vary, for example, step 410 may precede step 408. For example, after determining that the UI content comprises sensitive information in step 406, the sensitive information may be transmitted to the second application in step 410, and the second application may exclude or prohibit the sensitive information from being displayed via the second application in step 408.

It is also to be understood that step 410 may include transmission or broadcast of a sensitivity message to the second application. In some embodiments, the operating system of the computing device of the first application may determine that the first application is displaying sensitive information. Other applications, such as a second application, may have previously registered with the operating system to receive messages, and the operating system may broadcast the sensitivity message to the registered applications that are monitoring for messages. In some embodiments, the sensitivity message may provide to the second application instructions that prompt a notification on the display of the second application that the sensitive information is secure. In some embodiments in which the first application has not obfuscated the sensitive information, the sensitivity message may broadcast that the UI content contains sensitive information. Accordingly, the second application may obfuscate the sensitive information, such as by not displaying the UI content via the second application, or by not displaying the portion of the UI content that comprises the sensitive information.

In some embodiments, the indication by the sensitivity message to display a notification may not require obfuscation of sensitive information by the second application because the first application may have already obfuscated the information prior to transmission of the UI content. For example, the first application may have excluded or prohibited the transmission of the UI content. In other embodiments, the indication by the sensitivity message to display a notification may require obfuscation of sensitive information by the second application because the first application has not already obfuscated the information, for example, when the second application is relied upon to exclude or prohibit the display of the information. In some embodiments, the sensitivity message informs the second application to take an appropriate action with respect to the sensitive information. In some embodiments, the appropriate action may be based on a type or a classification of the second application or a sensitivity level of the sensitive information. In some embodiments, a lower sensitivity level may indicate that information is permitted to be shared, such as sharing UI content with a support agent who is internal to an organization and therefore may have privileges to view such lower sensitivity information. For further example, a picture may have a different or lower sensitivity level than a password. Under this example, a second application that is associated with a display device (described further below) may display the picture with screencasting, while a second application associated with a support agent computing device may not display the picture. Such may be advantageous, for example, because friends of a user may be viewing the picture on the display device, in contrast to a support agent who may be a stranger to the user.

Determination of Sensitive Information

Figure 5:
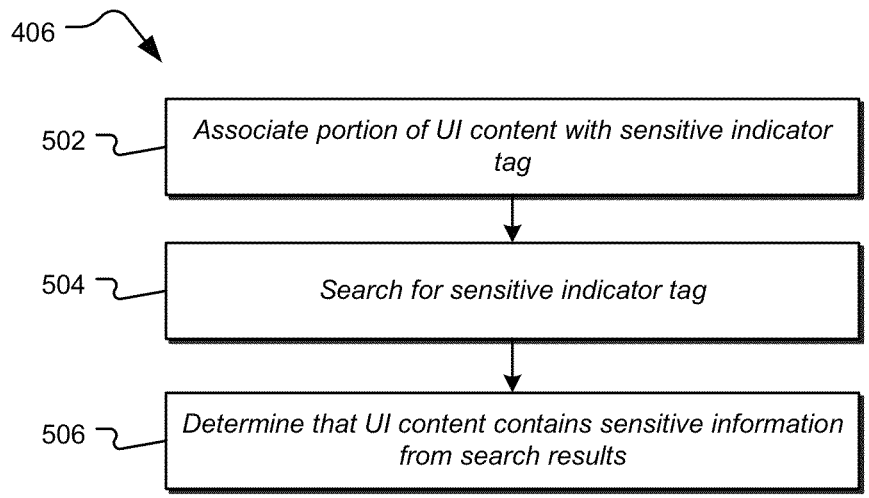
FIG. 5 is a flowchart illustrating a method of obfuscating sensitive information, in accordance with embodiments of the present invention.

FIG. 5 is a flowchart of step 406 illustrating a method of obfuscating sensitive information, in accordance with embodiments of the present invention. In step 502, at least a portion of UI content may be tagged content, which may be associated with a sensitive indicator tag or a security flag. For example, an application developer of a software application may choose to associate a sensitive field, such as a password field, with a sensitive indicator tag. If the software application is designed to be executed natively or locally via a tablet computing device's operating system, such as an Android operating system, a field considered to be sensitive by the application developer may be tagged with a property that indicates sensitivity. For example, a password field may be a text field and a property, attribute or event may be added to the text field for an indication of a sensitive indicator tag. In some embodiments, the UI content is searched for a property or attribute that indicates sensitive information. In other embodiments, a field may trigger an event associated with the field to announce that the content is sensitive. If the software application is a web application to be displayed within a browser application, sensitive information may be tagged, such as with a program instruction similar to: <span class="sensitive">SENSITIVE INFORMATION</span>. It is to be understood that such an example program instruction with respect to a web application is not meant to be limiting, and is illustrative of an embodiment for tagging a portion of UI content as sensitive. It is further to be understood that step 502 may be executed prior to step 402 of FIG. 4, as such step may be executed by an application developer during development of an application.

In step 504, the UI content may be searched for a sensitive indicator tag. For example, the fields of the UI content of a native application executed on an operating system, such as an Android operating system, may be searched for an added property, attribute or event to a text field that may be an indication of a sensitive indicator tag. For further example, if an event is associated with a field that is sensitive, tagged content may be determined by monitoring for event announcements. For further example, for a web application, information represented by HTML elements that are associated with a sensitive indicator tag may be found with a program instruction similar to: var tags_with_sensitive_information=jQuery(".sensitive"). It is to be understood that such an example program instruction with respect to a web application is not meant to be limiting, and is illustrative of an embodiment for searching for a sensitive indicator tag associated with UI content.

In step 506, based on the search results of step 504 of finding tagged content, such as finding at least one sensitive indicator tag associated with a portion of UI content, a determination may be made that the UI content includes sensitive information, and such tagged content may be obfuscated. For example, obfuscation of tagged content may include the communication module 204 of the support application 202 excluding the tagged content from being transmitted with the UI content. In this example, the untagged content of the UI content or data representing the UI content may be transmitted by the communication module 204 via the media channel 234 to the media service module 216 of the support network 200, from where the UI content may be transmitted to the support agent computing device 150. For further example, the operating system 240 may create a broadcast message that tagged content has been obfuscated. The broadcast message may be broadcasted by the control module 206 of the support application 202 via the control channel 230 to the central control module 210 of the support network 200, from where the broadcast message may be transmitted to the support agent computing device 150. Alternatively, if the search results do not determine that UI content comprises tagged content, such as no sensitive indicator tag is found by the search results of step 504, a determination may be made that the UI content is sharable information.

Figure 6:
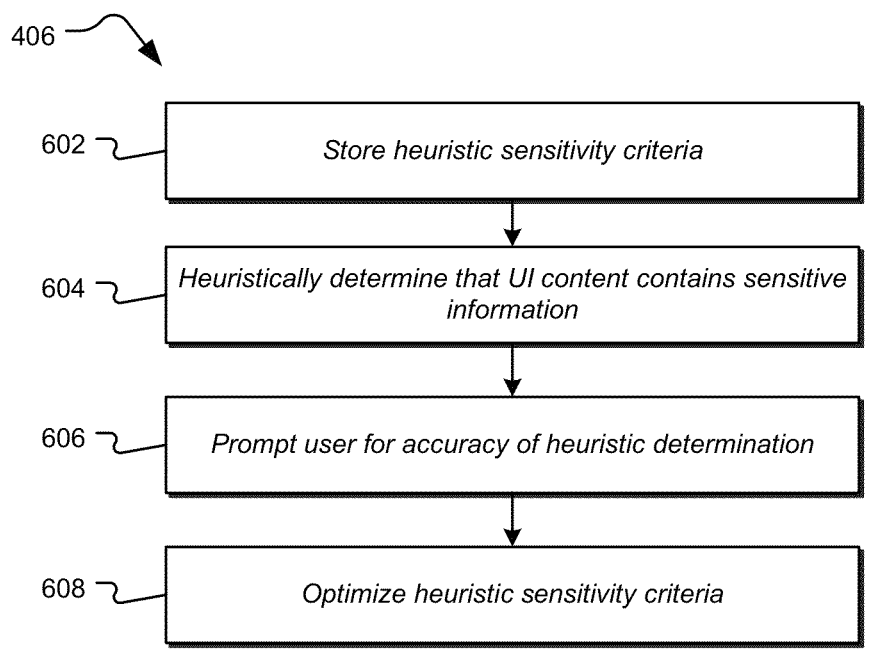
FIG. 6 is a flowchart illustrating a method of obfuscating sensitive information, in accordance with embodiments of the present invention.

FIG. 6 is a flowchart of step 406 illustrating a method of obfuscating sensitive information, in accordance with embodiments of the present invention. In step 602, one or more heuristic sensitivity criteria may be stored in a database, such as a cloud storage database, a database local to the computing device, and the like. It is to be understood that heuristic sensitivity criteria may comprise heuristic rules, heuristic parameters, and heuristic patterns, which may generate a sensitivity score assessing the sensitivity of the information.

Heuristic sensitivity criteria may include terms that indicate sensitivity or confidentiality, such as "password," "credit card," "social security number," "bank account," and other terms that may indicate sensitivity. Heuristic sensitivity criteria may also include acronyms or alternative representations of terms, such as "pw," "cc," "ssn," and the like. Heuristic sensitivity criteria may include a format of characters, such as text, numbers, punctuation symbols, and the like. For example, heuristic sensitivity criteria may include a format of a social security number, for example a three digit number followed by a hyphen followed by a two digit number followed by a hyphen followed by a four digit number ("###-##-####"). Heuristic sensitivity criteria may include references to portions of applications, such as a deep link to a logon web page that prompts the user for a password. In addition, heuristic sensitivity criteria may include two or more combinations of terms, representations of terms, formatting of text, references to portions of applications, and the like. For example, a heuristic sensitivity criteria may include a combination of "ssn" and a field format of "###-##-####," or the term "birth date" and a field format of "###-##-####." For further example, a heuristic sensitivity criteria may include a combination of a term of "bank account" and a dollar symbol ($) that may be associated with UI content, which may indicate sensitive information of a bank account balance. Such examples are not intended to be limiting, as some embodiments include any combination of a plurality of heuristic sensitivity criteria. It is to be understood that the heuristic sensitivity criteria may be stored in a single database or a plurality of databases in different locations, including a user's computing device. For example, a term, such as "password," may be stored in a cloud storage, while a reference to a portion of an application, such as a link to a logon page, may be stored on a user's computing device.

In step 604, it may be heuristically determined whether UI content contains sensitive information, for example utilizing one or more heuristics or algorithms. A heuristic may determine UI content that is indicated sensitive content. A heuristic may comprise searching for a text string using known search techniques such as regular expressions. The heuristic determination may utilize the heuristic sensitivity criteria, for example, by matching to, comparing with or searching for the heuristic sensitivity criteria in the UI content. In some embodiments, the UI content can be analyzed based on the display of characters and fields. In some embodiments, the UI content can be analyzed based on program instructions that, when executed, may cause the UI content to display. For example, the display of UI content may include a term such as "Password", such as the password prompt 174 shown in FIG. 1A. With this example, if a heuristic sensitivity criteria included the term "Password," then a heuristic may determine that the UI content contains sensitive information by, for example, detecting that term in the display of the UI content. For further example, the program instructions to display the UI content may include the term "Password," and by detecting that term within the program instructions, the heuristic may determine that the UI content contains sensitive information. Under some embodiments in which a computing device utilizes an Android operating system, a native application may comprise a plurality of object handles or native handles, and terms associated with object handles may be matched to, compared with or searched for the heuristic sensitivity criteria.

In step 606, a user may be prompted to assess the accuracy of the heuristic determination. In some embodiments, a heuristic may make a determination that is inferred, deduced or approximated, but not necessarily a correct, best, or exact determination. Accordingly, under some embodiments, a heuristic may make an incorrect determination that the UI content contains sensitive information. For example, if the UI content contains a field resembling a social security number format, such as "###-##-####" discussed above, the heuristic may heuristically determine that such is a social security number. However, the field may actually be a non-sensitive field, such as a product identifier number of a product catalog. Accordingly, a user may be prompted to deobfuscate the sensitive information from a second application because, for example, a user does not assess such information to be sensitive, because the user assesses such information to be sharable information.

In step 608, the stored heuristic sensitivity criteria may be optimized based on a user's choice whether or not to deobfuscate sensitive information. In some embodiments, such a choice may indicate the level of accuracy of the heuristic. Having such an indication may be utilized to improve a heuristic's future determination of sensitive information of UI content by modifying the heuristic sensitivity criteria, for example with additions, deletions and changes. In some embodiments, prompting a user for an assessment of the accuracy of a heuristic determination may provide a feedback loop for self-tuning and dynamic adaptation of the heuristic. Such feedback loops may provide for learning and adaptation of the heuristic. In some embodiments, stored heuristic sensitivity criteria may be optimized based on enterprise knowledge, domain knowledge, or organization knowledge. For example, an enterprise may consider certain information to be sensitive, such as employee identification numbers, and may include such enterprise knowledge or sensitivity patterns within the stored heuristic sensitivity criteria.

Under some embodiments, heuristic sensitivity criteria may be optimized through crowdsourcing, in which a plurality of users may provide feedback loops. For example, a heuristic sensitivity criteria may be optimized after a defined number of users make the same or similar choice whether or not to deobfuscate sensitive information, which was determined to be sensitive based on the same or similar heuristic sensitivity criteria. Under some embodiments, a plurality of users may or may not know that they are contributing to the optimization of a heuristic. For example, a user who is performing a task such as choosing to deobfuscate sensitive information may not be aware that the user is also performing a task of providing information that assesses the heuristic and that may lead to improvement of the heuristic in terms of optimality, completeness, accuracy, precision, execution time, and the like. For example, a heuristic may be optimized by adding to the heuristic sensitivity criteria a reference to a portion of an application, such as a deep link, that was determined to contain the sensitive information and that was not deobfuscated by a certain number of users. Such may improve, for example, the execution time of the heuristic when the UI content comprises a logon screen that users repeatedly access, and the heuristic sensitivity criteria comprises a reference to that logon screen.

It is to be understood that the order of the steps illustrated in FIGS. 4-6 are for illustrative purposes and are not meant to be limiting. For example, under some embodiments, step 502 of FIG. 5 may occur before step 402 of FIG. 4, as discussed above. For further example, step 606 and step 608 of FIG. 6 may occur after step 412 of FIG. 4. Under such an embodiment, a notification to a user of obfuscation may also include a prompting to the user to deobfuscate the sensitive information. It is also to be understood that under some embodiments, information that is determined to be sensitive may be obfuscated first, such as in step 408 of FIG. 4, and then a user may be prompted whether or not to deobfuscate the sensitive information as in step 606.

It is to be understood that the steps of FIG. 5 and the steps of FIG. 6 are not mutually exclusive. FIG. 5 may illustrate a method of utilizing a sensitive indicator tag, which may lead to a guarantee or high confidence level that information that was so tagged can be determined to be sensitive. FIG. 6 may illustrate a method of heuristically inferring or deducing sensitive information, which may not guarantee that all sensitive information will be determined, but may provide a higher likelihood of such determination. With these examples, the steps of FIG. 5 and the steps of FIG. 6 may be complementary to each other. For example, in step 502 of FIG. 6, an application developer may choose to tag certain information as sensitive, such as a password, but not tag other information as sensitive, such as a home address. In step 602 of FIG. 6, stored heuristic sensitivity criteria may relate in part to determining untagged information as sensitive, for example heuristic sensitivity criteria related to a home address. Accordingly, UI content from the application developer that contains a password may be obfuscated based on the steps of FIG. 5, and UI content from the same application developer that contains a home address may be obfuscated based on the steps of FIG. 6. Accordingly, under such an example, a password may be guaranteed or highly likely to be obfuscated via a sensitive indicator tag, while a home address may be likely or occasionally to be obfuscated via a heuristic utilizing heuristic sensitivity criteria related to a home address.

While the invention has been described in terms of particular embodiments and illustrative figures, those of ordinary skill in the art will recognize that the invention is not limited to the embodiments or figures described. For example, many of the embodiments described above may be applied to accessible technology, such as text readers and screen readers, either as an accessible application executed on a user's computing device or as a separate accessible device that is coupled to the user's computing device. Such text or screen readers may be utilized by users who cannot read text, such as those visually impaired or blind. As text is electronically read allowed by a text reader, under certain embodiments, when information is recognized as sensitive, the text reader may refrain from electronically reading aloud the sensitive information or may prompt the user to listen privately. For example, the text reader may prompt the user to put on earphones to keep the sensitive information private.

For further example, many of the embodiments described above may be applied to screencasting to display devices. Such display devices may be utilized by users who wish to display a screen to a group of people, such as an audience at a conference or friends at a party. As a screen is displayed to the group of people, under certain embodiments, when information is recognized as sensitive, the sensitive information may be obfuscated on the display device. For example, if a user wishes to show friends pictures that are stored in the cloud, if the user enters a password to access the cloud, the friends would not be able to view the password. Furthermore, it is to be understood that information may be tagged with different levels of sensitivity indicators. For example, a picture may be tagged as sensitive when shared with a remote support agent, but sharable or not sensitive when screencast to a display device. Under some embodiments, levels of sensitivity indicators may be based on the context with which the information is shared, such as, for example, sharing a screen with a support agent's computing device, in which information with high and low levels of sensitivity may be obfuscated, or a portable display device, in which information with only high levels of sensitivity may be obfuscated.

In embodiments described above, remote support of a user computing device 100 is provided by a customer support network 200. This network 200 may be provided, for example, by the manufacturer or retailer of the device 100 or of software operating on the device. In accordance with other embodiments of the present invention, support of a user computing device may be provided by another remote user. The remote user may operate a remote user computing device that may establish a support session directly with the user computing device 100 over a network, or the support session may be coordinated by the central control module 210. The remote user at the remote user computing device may be provided with the same or similar software or functionality described above with respect to the customer support agent computing device 150. However, instead of the remote support being provided by a corporate support service, the remote support may be provided by a family member or friend of the user at the user computing device 100. It is to be understood that under such an embodiment, sensitive information may be obfuscated from the remote user, such as a family member or friend of the user, as described above.

In other embodiments, the support software may be incorporated into a third party software application. The third party software application may include code for initiating a support session between the user computing device 100 and the customer support network 200 that may be operated by a company different from the third party software application developer. In this way the customer support network 200 and associated functionality described herein may be utilized by many different companies to provide enhanced customer support experiences. It is to be understood that under such an embodiment, sensitive information may be obfuscated as described above, regardless of the company providing enhanced customer support experiences.

Other embodiments of the present invention may be used in environments other than the customer support examples provided above. For example, some embodiments may be used for instructional purposes, such as a classroom or online learning environment. The teacher may utilize a support application with similar functionality as the customer support application described above, for interacting with a student's computing device. In some embodiments, the support application may provide the ability to interact with multiple computing devices, such as all of the computing devices used by a group of students in a class (e.g., a single physical classroom containing all of the students, or a virtual classroom with students physically located in different locations). The support application may enable the teacher to transmit graphical elements and/or share the teacher's screen with the students, and may further enable the teacher to select a screen sharing session with one of those students to view the content on that particular student's computing device. It is to be understood that under such an embodiment, a teacher's sensitive information may be obfuscated from a student when the teacher is sharing the teacher's screen. In some embodiments, a student's sensitive information may be obfuscated from a teacher when the teacher selects to enable a screen sharing session to view a student's screen.

Other embodiments of the present invention may be utilized in any other context in which one or more user computing devices communicate with one or more support computing devices via one or more one-way or two-way communication channels.

Figure 7:
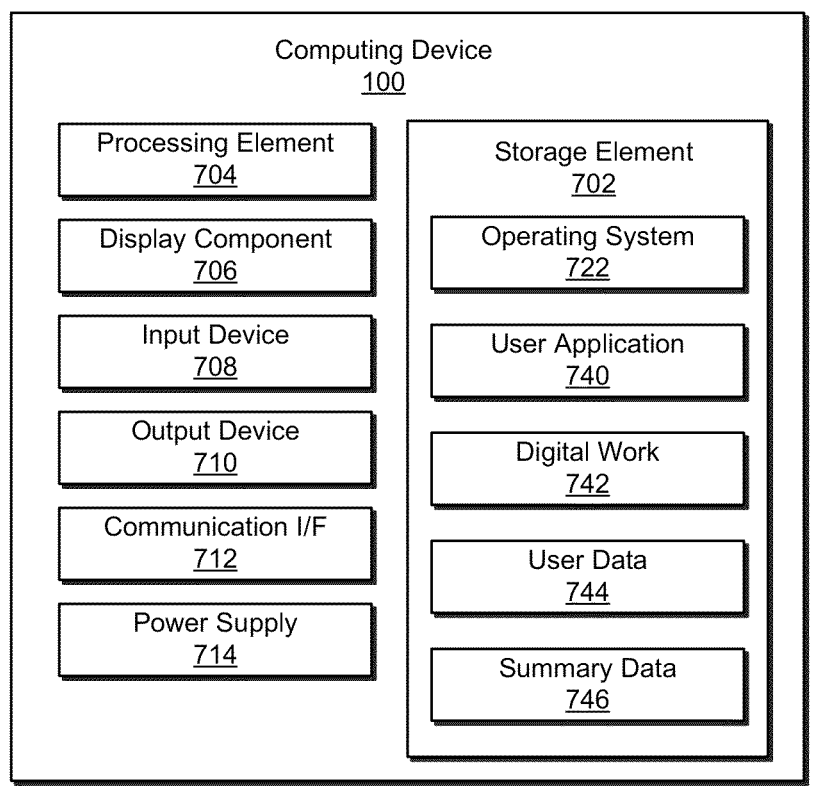
FIG. 7 illustrates an exemplary block diagram of a user computing device, in accordance with embodiments of the present invention.

FIG. 7 illustrates an exemplary block diagram of a user computing device 100, in accordance with embodiments of the present invention. The computing device 100 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein. The electronic device 100 may not necessarily be a mobile or portable device, and thus, in some implementations may comprise a desktop personal computer, a gaming system, a television, other home electronics devices, and other devices providing media presentation functionality.

The computing device 100 may include a display component 706. The display component 706 may comprise, for example, one or more devices such as cathode ray tubes (CRTs), liquid crystal display (LCD) screens, gas plasma-based flat panel displays, LCD projectors, or other types of display devices, etc.

The computing device 100 may include one or more input devices 708 operable to receive inputs from a user. The input devices 708 can include, for example, a push button, touch pad, touch screen, wheel, joystick, keyboard, mouse, trackball, keypad, accelerometer, light gun, game controller, or any other such device or element whereby a user can provide inputs to the computing device 100. These input devices 708 may be incorporated into the computing device 100 or operably coupled to the computing device 100 via wired or wireless interface. For computing devices with touch sensitive displays, the input devices 708 can include a touch sensor that operates in conjunction with the display component 706 to permit users to interact with the image displayed by the display component 706 using touch inputs (e.g., with a finger or stylus).

The computing device 100 may also include at least one communication interface 712, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the computing device 100 may also include one or more wired communications interfaces for coupling and communicating with other devices.

The computing device 100 may also include a power supply 714, such as, for example, a rechargeable battery operable to be recharged through conventional plug-in approaches, or through other approaches such as capacitive charging.

The computing device 100 also includes a processing element 704 for executing instructions and retrieving data stored in a storage element 702. As would be apparent to one of ordinary skill in the art, the storage element 702 can include one or more different types of memory, data storage or computer-readable storage media, such as, for example, a first data storage for program instructions for execution by the processing element 704, a second data storage for images or data and/or a removable storage for transferring data to other devices.

The storage element 702 may store software for execution by the processing element 704, such as, for example, operating system software 722 and user applications such as user application 740. The storage element 702 may also store data, such as, for example, files corresponding to one or more digital works 742, user data 744 relating to the user's consumption of those digital works 742 and other device metrics, and summary data 746 relating to the digital works 742.

Embodiments of the present invention may provide numerous advantages. For example, a user who is having technical difficulties with a customer device may be less reluctant to screen share with a remote support agent knowing that the remote support agent will not be able to view information that has been tagged as sensitive or that is heuristically determined to be sensitive. In addition, developers of applications who wish to provide enhanced remote support can confidently take advantage of tagging information as sensitive knowing that the result will be an assurance to the user that such tagged information will not be viewed by the remote support agent. Finally, when another application developer chooses not to tag sensitive information, the heuristic determination of sensitive information under some embodiments may provide improved self-adaptation of the heuristic that may increase the predictive nature of the heuristic, providing increased assurances to the application developer to offer enhanced remote support despite the lack of tagging of sensitive information by the other application developer.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method of preventing information considered to be sensitive from viewing by a customer support agent, comprising:
   establishing a support session between a user computing device and a support agent computing device;
   transmitting first user interface (UI) content displayed on a display of the user computing device from the user computing device to the support agent computing device;
   receiving support content from the support agent computing device, the support content comprising a graphical element, and the graphical element being generated by the customer support agent viewing the first UI content at the support agent computing device;
   displaying on the display of the user computing device the first UI content and the support content overlaid on the first UI content;
   searching for a sensitive indicator tag associated with a field of second UI content;
   determining from the searching that the second UI content displayed on the user computing device contains sensitive information;
   in response to the determination that the second UI content contains the sensitive information, obfuscating the sensitive information in the second UI content from display on the support agent computing device; and
   displaying on the display of the user computing device the second UI content including the sensitive information.

2. The method of claim 1, wherein:
   said searching for the sensitive indicator tag comprises determining that the user computing device is displaying a keyboard representation; and
   in response to the determination that the user computing device is displaying the keyboard representation, obfuscating the keyboard representation from display on the support agent computing device.

3. The method of claim 1, wherein the determining that the second UI content contains the sensitive information comprises:
  determining a number is being rendered in a field that has a format XXX-XX-XXX, where each X represents a numerical digit; and
  in response to determining the number being rendered having the format XXX-XX-XXX, concluding that the number is a social security number and obfuscating the social security number from display on the support agent computing device.

4. A computer-implemented communication method of providing remote technical support, comprising:
  establishing a communication channel between a first application on a first computing device and a second application on a second computing device;
  determining that user interface (UI) content of the first application contains sensitive information;
  obfuscating the sensitive information of the UI content;
  transmitting via the communication channel data representing the UI content from the first application to the second application such that the obfuscated sensitive information is protected from display by the second application;
  receiving from the second application support content comprising a graphical element; and
  displaying on the first computing device the UI content including the sensitive information and the support content instead of a portion of the UI content.

5. The method of claim 4, wherein the obfuscating the sensitive information from the second application comprises obfuscating at least a portion of non-sensitive information of the transmitted data representing the UI content.

6. The method of claim 4, wherein the determining that the UI content contains the sensitive information comprises:
  prior to transmitting the data representing the UI content, searching for a sensitive indicator tag associated with a portion of the UI content; and
  identifying tagged content within the portion of the UI content, the tagged content being at least a portion of the sensitive information,
  wherein obfuscating the sensitive information is based at least in part upon identifying the tagged content.

7. The method of claim 6, further comprising:
  prior to transmitting the data representing the UI content, searching for a second sensitive indicator tag associated with a second portion of the UI content; and
  identifying second tagged content within the second portion of the UI content, the second tagged content being at least a portion of the second sensitive information, the second sensitive indicator tag indicating a lower level of sensitivity that permits sharing of the second sensitive information to the second application and that prohibits sharing of the second sensitive information to a third application.

8. The method of claim 4, wherein the determining that the UI content contains the sensitive information comprises:
  prior to transmitting the data representing the UI content, heuristically determining an indication that the UI content contains the sensitive information based on at least one stored heuristic sensitivity criteria; and
  identifying indicated sensitive content within the portion of the UI content, the indicated sensitive content being at least a portion of the sensitive information,
  wherein obfuscating the sensitive information is based at least in part upon identifying the indicated sensitive content.

9. The method of claim 8, further comprising:
  determining accuracy of the heuristically determined indication that the UI content contains the sensitive information; and
  modifying the at least one stored heuristic sensitivity criteria based on the accuracy.

10. The method of claim 9, wherein determining the accuracy comprises determining whether a user of the first application indicated that the UI content contains shareable information.

11. The method of claim 4, wherein the second application is a sharing application configured to be executed by the second computing device that is remote from the first computing device.

12. The method of claim 11, wherein obfuscating the sensitive information includes prohibiting the sharing application from displaying the sensitive information.

13. The method of claim 11, wherein obfuscating the sensitive information includes prohibiting the first application from transmitting the sensitive information to the sharing application.

14. The method of claim 4, wherein the first application is configured to be executed by a first computing device, wherein the second application is a text reader application configured to be executed by the first computing device, and wherein the sensitive information is obfuscated from the text reader application by the text reader application prohibiting the sensitive information from being electronically read aloud publicly.

15. The method of claim 4, further comprising:
  based on the determination that the UI content contains the sensitive information, broadcasting a sensitivity message to the second application instructing the second application to display a prompt that the sensitive information is obfuscated from the second application.

16. The method of claim 4, further comprising:
  displaying a prompt to a user of the first application that the sensitive information has been obfuscated from the second application.

17. The method of claim 4, further comprising:
  receiving from the second application a video image of a customer support agent operating the second computing device; and
  displaying the video image of the customer support agent on the first computing device.

18. The method of claim 4, further comprising:
  prompting the user of the first application whether to deobfuscate the sensitive information from the second application.

19. A user computing device, comprising:
  a display component;
  a non-transitory computer-readable medium configured to store machine-readable instructions; and
  a processing element communicatively coupled to the non-transitory computer-readable medium, the processing element configured to execute the machine-readable instructions to:
    establish a communication channel between the user computing device and a customer support agent computing device;
    determine that user interface (UI) content of the user computing device contains sensitive information;
    obfuscate the sensitive information of the UI content from the customer support agent computing device;

transmit via the communication channel the data representing the UI content with the obfuscated sensitive information from the user computing device to the customer support agent computing device;

receive from the customer support agent computing device support content comprising a graphical element; and display on the display component the UI content including the sensitive information and the support content instead of a portion of the UI content.

20. The user computing device of claim 19, wherein the processing element is further configured to execute the machine-readable instructions to, prior to the transmission of the data representing the UI content, search for a sensitive indicator tag associated with a portion of the UI content and to identify tagged content within the portion of the UI content, the tagged content being at least a portion of the sensitive information, wherein the obfuscation of the sensitive information is based at least in part upon the identification of the tagged content.

21. The user computing device of claim 19, wherein the processing element is further configured to execute the machine-readable instructions to, prior to the transmission of the data representing the UI content, heuristically determine an indication that the UI content contains the sensitive information based on at least one heuristic sensitivity criteria stored in the non-transitory computer-readable medium and to identify indicated sensitive content within the portion of the UI content, the indicated sensitive content being at least a portion of the sensitive information, wherein the obfuscation of the sensitive information is based at least in part upon the identification of the indicated sensitive content.

22. The user computing device of claim 19, wherein the processing element is further configured to execute the machine-readable instructions to:

cause the display component to display a prompt to a user of the user computing device that the sensitive information has been obfuscated from the customer support agent computing device.

23. The user computing device of claim 19, wherein the processing element is further configured to execute the machine-readable instructions to:

receive from the customer support agent computing device a video image of a customer support agent operating the customer support agent computing device; and display the video image of the customer support agent on the display component.

24. The user computing device of claim 19, wherein the processing element is further configured to execute the machine-readable instructions to:

cause the display component to prompt the user of the user computing device whether to deobfuscate the sensitive information from the customer support agent computing device.

* * * * *